US012187461B2

(12) United States Patent
Gacoin et al.

(10) Patent No.: US 12,187,461 B2
(45) Date of Patent: Jan. 7, 2025

(54) DAMPED MACHINED PRIMARY STRUCTURE FOR A SPACECRAFT, SATELLITE INCORPORATING THIS PRIMARY STRUCTURE AND METHOD FOR MANUFACTURING SUCH A SATELLITE

(71) Applicant: AIRBUS DEFENCE AND SPACE SAS, Toulouse (FR)

(72) Inventors: Florian Gacoin, Toulouse (FR); Jean-Marc Pierinet, Toulouse (FR); Mireya Joya, Toulouse (FR); Julien Pradal, Toulouse (FR); Sara Lopez-Sanchez, Toulouse (FR); Nicolas Fabre, Toulouse (FR)

(73) Assignee: Airbus Defence and Space SAS, Toulouse (FR)

( * ) Notice: Subject to any disclaimer, the term of this patent is extended or adjusted under 35 U.S.C. 154(b) by 133 days.

(21) Appl. No.: 18/014,870

(22) PCT Filed: Jul. 2, 2021

(86) PCT No.: PCT/EP2021/068392
§ 371 (c)(1),
(2) Date: Jan. 6, 2023

(87) PCT Pub. No.: WO2022/008386
PCT Pub. Date: Jan. 13, 2022

(65) Prior Publication Data
US 2023/0348112 A1    Nov. 2, 2023

(30) Foreign Application Priority Data
Jul. 8, 2020   (FR) ........................................ 2007212

(51) Int. Cl.
B64G 1/22        (2006.01)

(52) U.S. Cl.
CPC ............... B64G 1/228 (2023.08); B64G 1/22 (2013.01)

(58) Field of Classification Search
CPC ......... B64G 1/641; B64G 1/6425; F16F 1/38; F16F 13/14; F16C 33/04
See application file for complete search history.

(56) References Cited

U.S. PATENT DOCUMENTS 5,994,640 A * 11/1999 Bansemir ................. B64G 1/38
                                                          428/116
9,446,863 B2 * 9/2016 Cheynet de Beaupre ...................
                                                          B64G 1/10
(Continued)

FOREIGN PATENT DOCUMENTS

FR       2971233        8/2012
JP       2003326622     11/2003
(Continued)

OTHER PUBLICATIONS

International Search Report for PCT/EP2021/068392, mailed Sep. 28, 2021, 4 pages.
(Continued)

*Primary Examiner* — Joshua J Michener
*Assistant Examiner* — Michael B. Kreiner
(74) *Attorney, Agent, or Firm* — Nixon & Vanderhye P.C.

(57) ABSTRACT

A primary structure (100) for a spacecraft (200) including an interface ring (10) and a predetermined number of panels defining a box arranged to close an interior volume of the spacecraft. The box is connected to the interface ring. Side panels of the box are parallel to a geometric axis (A) of the interface ring, the interface ring is temporarily fastened to a system supporting the spacecraft in a launcher. Each panel is a one-piece panel formed by machining a metal material.

(Continued)

The side panels at the base of the box are connected to the interface ring (10) via damping inserts (60).

12 Claims, 11 Drawing Sheets

(56) References Cited

U.S. PATENT DOCUMENTS

| | | | |
|---|---|---|---|
| 9,592,922 B2* | 3/2017 | Aridon | B64G 1/641 |
| 10,145,442 B2* | 12/2018 | Ditzel | F16F 13/1463 |
| 10,400,804 B2* | 9/2019 | Cheynet De Beaupre | F16B 11/006 |
| 11,542,041 B2* | 1/2023 | Aston | B64G 1/10 |
| 2006/0185277 A1* | 8/2006 | Quincieu | B64G 1/10 52/265 |
| 2013/0099059 A1 | 4/2013 | Cheynet De Beaupre | |
| 2018/0266461 A1 | 9/2018 | Cheynet De Beaupre et al. | |

FOREIGN PATENT DOCUMENTS

| | | |
|---|---|---|
| WO | 2017/060392 | 4/2017 |
| WO | 2019/223984 | 11/2019 |

OTHER PUBLICATIONS

Written Opinion of the ISA for PCT/EP2021/068392, mailed Sep. 28, 2021, 7 pages.

\* cited by examiner

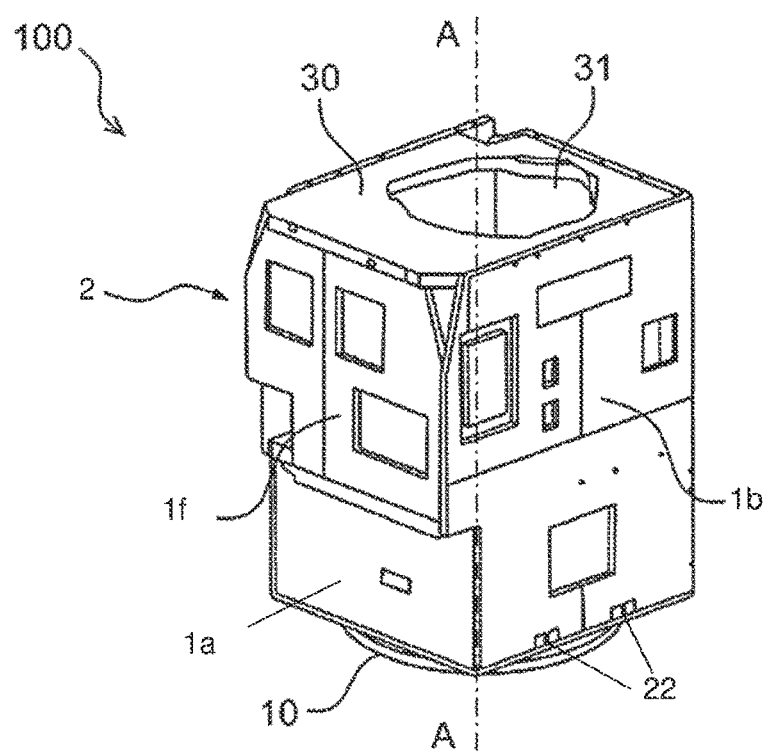

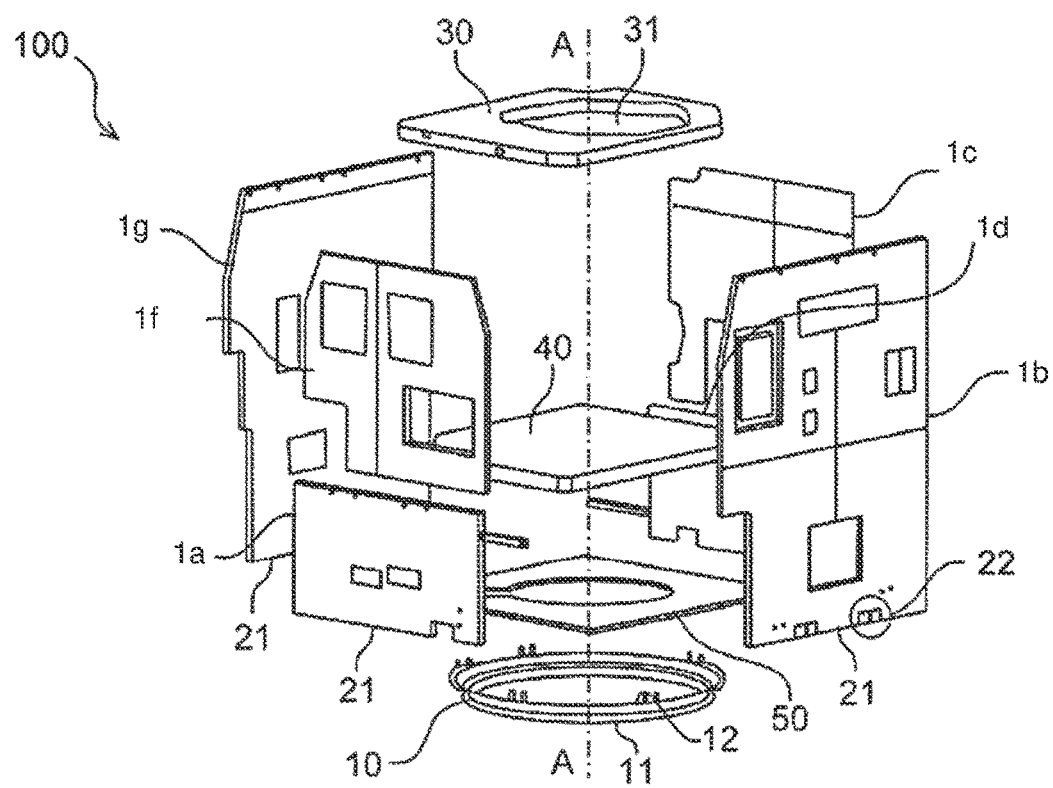

DAMPED MACHINED PRIMARY STRUCTURE FOR A SPACECRAFT, SATELLITE INCORPORATING THIS PRIMARY STRUCTURE AND METHOD FOR MANUFACTURING SUCH A SATELLITE

RELATED APPLICATION

This application is the U.S. national phase of International Application PCT/EP2021/068392, filed Jul. 2, 2021, which designated the U.S. and claims priority to French patent application FR 2007212, filed Jul. 8, 2020, the entire contents of each of which are hereby incorporated by reference.

TECHNICAL FIELD

The present invention relates to the field of spacecraft, in particular the mechanical design thereof, and more particularly concerns a primary structure for spacecraft and the manufacturing method thereof. Manufactured primary structures operating in a dynamic vibrational environment, such as an artificial satellite, comprise interconnected panels. Such a primary structure is in particular used as the basic mechanical structure of a scientific satellite such as an Earth observation satellite.

PRIOR ART

For any craft intended to move in space, such as an artificial satellite, the primary structure is an essential component that is dimensioned and qualified to cope with the various stresses to which the spacecraft is subjected throughout its life: on the test beds, in the launcher and in orbit.

A major part of the mechanical stresses is caused by the vibrations generated by the launcher, for example during take-off or during the separation and release phases. To a lesser extent, the autonomous manoeuvres of the satellite in orbit, which are accompanied by a generation of thrust from the propulsion systems, also result in the appearance of mechanical loads within the satellite.

In addition to withstanding the vibrations, the primary structure of a satellite must, by absorbing a part of the vibrations, be able to attenuate the vibrations transmitted to the satellite's equipment, which is sometimes extremely sensitive. Moreover, the primary structure must also be able to limit the amplification of certain vibrations generated by the operation of the on-board equipment itself.

It is thus essential that the primary structure of the satellite has a certain mechanical strength while meeting the requirements in terms of mass and stiffness. In this logic, the material from which the primary structure is made plays an important role.

For artificial satellites or other space systems, the primary structure usually consists of composite panels assembled together by metal connecting parts. For example, these panels have a honeycomb sandwich structure, which increases the mechanical strength thereof and ensures maximum lightness. Honeycomb composite panels are widely employed in the aerospace construction industry and can be used to solve certain mechanical or thermal engineering problems, as explained in the French patent No. 2971233A1 and the Japanese patent No. 2003326622A.

Honeycomb composite panels can be multi-material or single-material panels and comprise two sheets forming the two faces thereof, joined together by a honeycomb core. Honeycomb panels are generally complex to manufacture and expensive. The long manufacturing cycle thereof usually implies supply difficulties. Moreover, the use thereof can require operations for defining and arranging the primary structure of the satellite to be started particularly early in the action plan for a new satellite manufacturing programme.

More specifically, in order to build equipment-holding walls with honeycomb panels for satellites, the specific arrangements of these walls and the general architecture of the satellite must usually be taken into account, which leads to defining the primary structure by assembling a plurality of honeycomb panels using hundreds of interface and connection elements such as inserts and brackets.

Furthermore, the number of industrial suppliers for this type of complex panel is still limited, which can further increase the supply risk factor.

DESCRIPTION OF THE INVENTION

The present invention aims to overcome the aforementioned drawbacks of the prior art, in particular to reduce the costs and manufacturing times for spacecraft and the primary structure thereof, in order to better meet a growing demand in an increasingly competitive space context.

The invention thus relates to a primary structure for a spacecraft comprising an interface ring and a predetermined number of panels defining a box arranged so as to close an interior volume of the spacecraft, the box being connected to the interface ring, the side panels of the box being parallel to a geometric axis of the interface ring, the interface ring being intended to be temporarily fastened to a system supporting the spacecraft in a launcher, characterised in that each panel is a one-piece panel and is obtained by machining a metal material and in that the side panels at the base of the box are connected to the interface ring via damping inserts.

According to a feature of the invention, each panel is obtained by machining a single solid metal block, each panel comprising a network of intersecting ribs connected to one another by thinned plates, the network of ribs being arranged, in each panel, so as to induce at least a determined stiffness as well as a transfer of forces between a proximal edge and a distal edge relative to the interface ring.

According to an additional feature of the invention, said network of ribs comprises a first peripheral rib defining a contour of each panel, some of the panels comprising at least one opening and said network of ribs thus comprising at least a second peripheral rib defining said opening, some of the panels comprising at least one instrument-holding interface and said network of ribs thus comprising at least a third peripheral rib defining said instrument-holding interface, this interface being closed by one of said thinned plates having a thickness that is determined as a function of a heat evacuation requirement for the instrument.

According to an additional feature of the invention, the thinned plates at the instrument-holding interfaces are disposed on the inside of the box relative to the ribs, whereas other thinned plates are disposed on the outside of the box relative to the ribs, which are thus disposed such that they project into the box to allow internal elements to be fastened to the spacecraft.

According to an additional feature of the invention, the ribs are made such that they are wider at determined positions corresponding to drilled and threaded fastening points.

According to an additional feature of the invention, the side panels at the base of the box comprise open recesses for receiving the damping inserts, each of these recesses being defined by a rib, the latter rib being continued by at least one rib extending in a longitudinal direction relative to the geometric axis of the interface ring.

According to an additional feature of the invention, each damping insert includes:

- an external part fastened in the recess thereof taking on the form of a hole with a given cross-section, the external part having an external surface with the same cross-section as the hole and being capable of being inserted into the recess,
- an internal part capable of being fastened to the interface ring and
- an elastomer layer between the external part and the internal part, the external and internal parts being coaxial and having surfaces that face one another and that are notched and longitudinally offset from one another, so as to define a wave-shaped volume receiving the elastomer layer.

The invention further relates to an artificial satellite comprising a primary structure according to the invention. Typically, such an artificial satellite has a mass of between 100 kg and 1,000 kg for example.

The invention further relates to a method for manufacturing a spacecraft comprising a step of defining a predetermined number of panels defining a box connected to an interface ring and arranged so as to close an interior volume of the spacecraft, characterised in that it comprises:

- A step of machining the panels, each made from a single solid metal block from which material is removed
- An assembly step comprising assembling the machined panels directly to one another to form the box, assembling damping inserts with the interface ring to form a primary structure of the spacecraft, the damping inserts being arranged directly in machined panels parallel to a geometric axis of the interface ring and disposed at the base of the box, and assembling component elements of the spacecraft directly with the machined panels.

According to an additional feature of the invention, the machining step is carried out so as to create a network of intersecting ribs connected to one another by thinned plates, the network of ribs being arranged, in each panel, so as to provide a determined stiffness as well as a transfer of forces between a proximal edge and a distal edge relative to the interface ring.

According to an additional feature of the invention, at least one of the panels is machined such that the network of ribs thereof comprises at least one peripheral rib defining at least one instrument-holding interface, this interface being closed by one of said thinned plates having a thickness that is determined as a function of a heat evacuation requirement for the instrument.

According to an additional feature of the invention, said panel is machined such that the thinned plates at the instrument-holding interfaces are disposed on the inside of the box relative to the ribs, whereas other thinned plates are disposed on the outside of the box relative to the ribs, which are thus disposed such that they project towards the inside of the box to allow internal elements of the spacecraft to be fastened thereto.

According to an additional feature of the invention, open recesses for receiving the damping inserts are machined in the panels parallel to a geometric axis of the interface ring and disposed at the base of the box, a rib being left at the periphery of each of these recesses and at least one rib being left in the continuation thereof, in a longitudinal direction relative to the geometric axis of the interface ring.

According to an additional feature of the invention, the panels are machined leaving a rib defining the periphery of each panel.

According to an additional feature of the invention, panels are machined while making at least one opening and leaving at least one rib defining the periphery of said opening.

According to an additional feature of the invention, the ribs are made such that they are wider at determined positions corresponding to drilled and threaded fastening points.

For example, the panels are machined from a plate made of metal, such as aluminium, with a thickness greater than the maximum thickness of the ribs.

Advantageously, the primary structure according to the invention, although using one-piece machined panels, allows vibrations propagating in a longitudinal plane of the side panels to be effectively damped, while respecting the stiffness and mass requirements. In particular, the panels machined according to the invention do not have a honeycomb core. The present invention has in particular overcome a technological limitation regarding an effective replacement for existing honeycomb panels that would sufficiently preserve mechanical performance. It should be noted that during a launch, the sidewalls of the satellite are placed substantially parallel to the axis of the launcher and thus work essentially under shear due to the longitudinal vibrations of the launcher. As a result, honeycomb walls, which also include a plurality of parts that are bonded to one another, damp the vibrations, and in particular longitudinal vibrations, due to the relatively low shear modulus thereof. In other words, these panels have a certain shear flexibility which allows them to damp longitudinal vibrations in particular. The replacement of the honeycomb panels was thus difficult to conceive considering the shear stiffness and mass constraints.

A further advantage of the present invention is the ease of assembly of the panels with one another and with other component elements of the spacecraft. More specifically, the panels according to the invention can be joined with direct contact with one another, without the need for inserts embedded in the panel or a connecting bracket for example. The panels can also be fastened directly to a base of an instrument or to a fastener of a component element of the spacecraft. The fastening point on the panel will, for example, be strengthened by leaving an excess of material, for example in the form of a rib, so as to optionally produce a threaded hole.

A further advantage of the present invention is that it facilitates the arrangement of the component elements of the spacecraft, for example the connections can be placed at the edge of the panels, the passage holes can, for example, be located close to the geometric limits of the panels and the cavities for electrical connections can, for example, be integrated directly into the machined panels. The present invention thus allows the requirements concerning vibration resistance, stiffness and mass to be met, while facilitating the design and assembly of the spacecraft.

The fundamental concepts of the invention have been set out in their most basic form, and other details and features will more clearly emerge on reading the following description and with reference to the accompanying drawings, which give, by way of a non-limiting example, embodiments of a satellite and of the damped machined primary structure thereof in accordance with the principles of the invention.

BRIEF DESCRIPTION OF THE FIGURES

The figures are given for illustrative purposes only for the sake of clarity and do not limit the scope of the invention.

The different elements are represented diagrammatically and are not necessarily to the same scale. Identical or equivalent elements bear the same reference numerals in all figures.

The drawings thus illustrate, in:

FIG. 1 is a perspective view of an artificial satellite including a primary structure according to the invention;

FIG. 2 is a perspective view of a primary structure according to the invention;

FIG. 3a is an exploded view from a first perspective of the primary structure in FIG. 2;

FIG. 3b is an exploded view from a second perspective of the primary structure in FIG. 2;

FIG. 4 is a cross-sectional view of a damping insert providing a local connection between a side panel at the base of the box and an interface ring of the primary structure according to the invention;

FIG. 5 is a perspective view of a damping insert according to the invention;

FIG. 6 is a cross-section of FIG. 5 along a longitudinal plane B-B;

FIG. 7 is a partial, perspective view of an example primary structure according to the invention;

FIG. 8 is a partial, perspective view of a panel comprising an opening;

FIG. 9 is a perspective view of a side panel at the base of the box;

FIG. 10 is a partial, perspective view of a junction between three panels.

DETAILED DESCRIPTION OF THE EMBODIMENTS

In the present description, reference is made to a machined primary structure damped at its base for a spacecraft, intended primarily for artificial satellites of a so-called box-shaped architecture such as certain Earth observation satellites. However, the word "box" should not be interpreted restrictively, as the primary structure according to the invention can be adapted to a wide variety of spacecraft. The term "primary structure" is understood to mean the basic structure for the constitution of a space platform. The term "satellite" refers to an artificial satellite.

Figure 1:
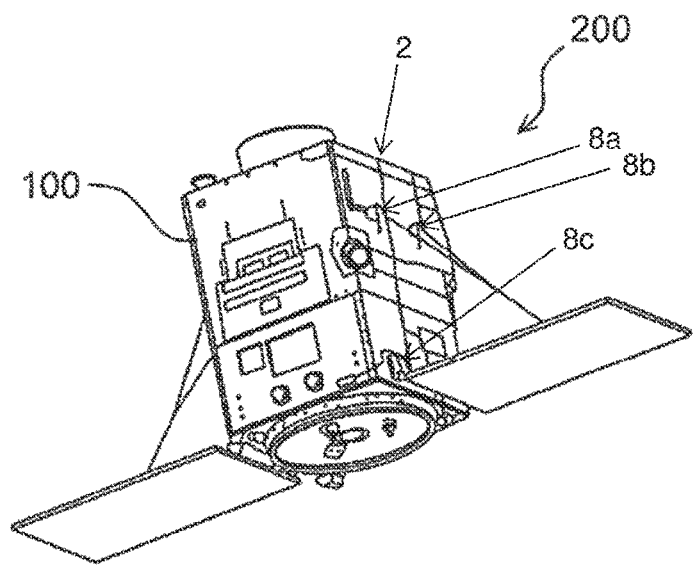

FIG. 1 shows a satellite 200 in a deployed configuration, for example operating in orbit, the body whereof is primarily made up of a damped machined primary structure 100 according to the invention. The primary structure 100 is sized in order to satisfy the dynamic environment that satellites experience during launch as well as during operation, for example during orbital manoeuvres. The primary structure 100 comprises a box 2 to which component elements of the satellite 200 are added. The box 2 in this case is made up of panels that are machined and joined directly to one another. Fastening points 8a and 8b for retaining cables, for example, are provided on an outer face directly on a panel. Fastening points 8c for solar array hinges are, for example, provided on an outer face directly on a panel.

FIG. 2 shows, in an isolated manner, the primary structure 100 having a box 2 with an overall parallelepiped shape and including an interface ring 10, via which the satellite is intended to be rigidly fastened to a satellite-carrying deck of a launcher.

The box 2 could, in a non-limiting manner, take other forms. In this case, the box 2 comprises walls, each consisting of one or more panels 1a, 1b and 1f. A panel 30, opposite the interface ring, comprises for example an opening 31 intended to allow an instrument to pass. This panel 30, for example referred to as the "Earth panel", closes one face of the box pointing towards the Earth when the satellite is operational.

It should be noted that the rigid fastening of the interface ring 10 to the launcher is temporary, so as to be broken during release of the satellite, which is accompanied by an intense level of vibrations in the satellite. The side panels 1a and 1b at the base of the box are connected to the interface ring 10 via damping inserts thus producing a simplified architecture whilst being able to withstand the required level of vibration. Recesses 22 for the inserts are made in the side panels at the base of the box. Further side panels 1f are, for example, fastened to the side panels at the base of the box to form lateral walls of the box 2. The primary structure 100, according to the example shown, has an overall rectangular parallelepipedal shape with a substantially square cross-section, and in this case includes four lateral walls. A wall is made up of one or more panels, the walls being fastened to one another to form the box. However, this parallelepipedal shape is not restrictive and the primary structure can have a parallelepipedal shape with any cross-section, such as a rhombus, or a prismatic shape with a triangular or polygonal cross-section of any kind, in each case with a suitable number of panels assembled for this purpose.

Figure 3B:
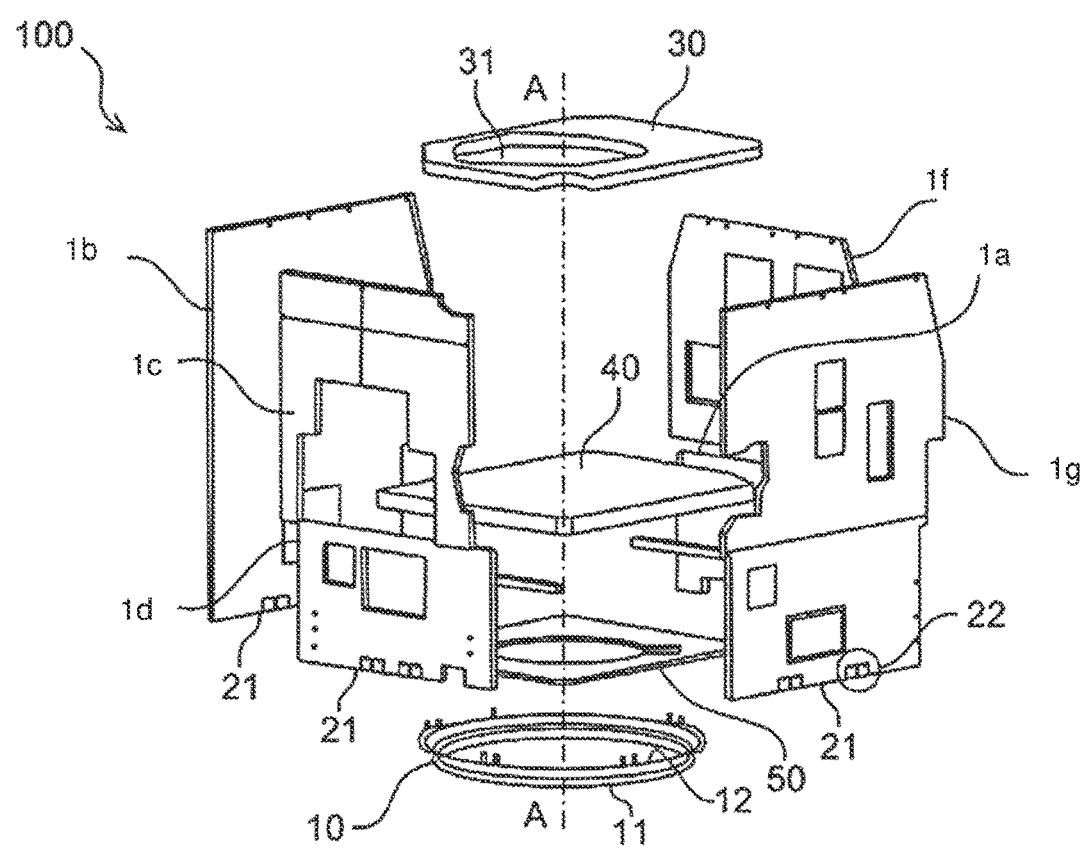

With reference to FIGS. 3a and 3b, the primary structure 100 includes, for example, the interface ring 10 connected to a plurality of machined panels forming the walls of the box. The walls of the box comprise, for example, lateral walls, an orifice plate 50 against the interface ring, an "Earth" panel 30 disposed opposite the interface ring and an instrument-holding inner transverse plate 40. The orifice plate 50 can be held against the interface ring 10.

Two opposing lateral walls are, for example, each formed by two machined panels 1f and 1a on the one hand and 1c and 1d on the other hand, whereas two other opposing lateral walls are, for example, each formed by a single machined panel 1b or 1g. The transverse wall opposite the interface ring, forming the "Earth" panel, is for example formed from a single machined panel 30. The transverse orifice plate 50 is, for example, formed from a single machined panel. The instrument-holding inner plate 40 is, for example, formed from a single machined panel.

The box is thus arranged so as to close an interior volume of the spacecraft intended to receive the mission instrument as well as numerous component elements of the satellite.

The box is connected to the interface ring 10 and in particular to the top face 12 thereof, the bottom face 11 thereof being temporarily connected to the launcher. The side panels of the box or the lateral walls of the box refer to the panels or walls that are parallel to a geometric axis A of the interface ring 10.

Each panel 1a, 1b or 1f is a one-piece panel and is obtained by machining a metal material, such as aluminium. For example, a metal plate is machined to produce each panel. The side panels 1a and 1b, disposed at the base of the box, are connected to the interface ring 10 via damping inserts. These inserts are disposed in recesses 22 in these side panels disposed at the base of the box.

Advantageously, the primary structure 100 is made from machined panels directly connected to one another to form the box. The shapes of these panels are optimised, using computer tools such as finite element method calculators, to obtain a mass-to-stiffness ratio that is compatible with the space environment.

The interface ring 10, better known by its acronym SIR (Satellite Interface Ring), is circular and defines an axis A extending along a longitudinal axis of the satellite. This geometric axis A of the ring passes through the centre of the ring and is perpendicular to a plane in which the interface ring extends.

The interface ring 10 is known to have a bottom face 11 of standard diameter, via which it temporarily connects to another interface ring of the same diameter belonging to a launcher or to a test bed, and a top face 12 on which the box is assembled.

The side panels 1*a* and 1*b*, fastened to the interface ring 10, are parallel to the geometric axis A of the interface ring. Various on-board systems on the satellite fasten directly to the panels, which are shaped according to a predetermined arrangement of the satellite, such that certain equipment and utilities can be fastened directly thereto. For this purpose, the panels can thus comprise openings, ribs, or plates forming an interface or fastening points.

Figure 10:
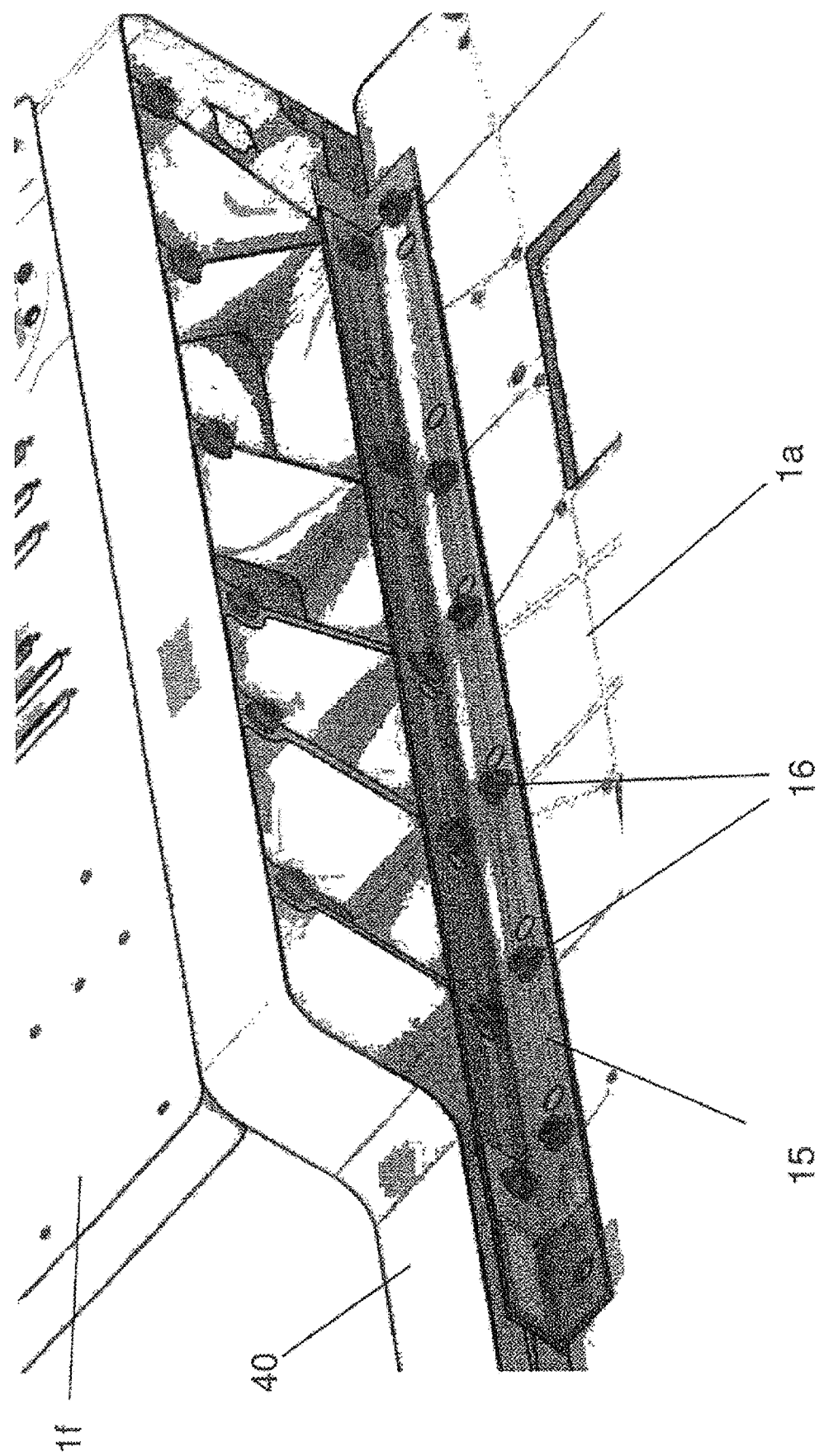

The box comprises four lateral walls fastened in pairs and perpendicularly to one another. The box comprises its wall 30 opposite the ring, its inner plate 40 and its orifice plate 50 disposed perpendicularly to the geometric axis of the ring and perpendicularly to the lateral walls. Moreover, two opposing lateral walls are both formed by two side panels 1*a* and 1*f* which come against two opposite faces of the instrument-holding plate, as shown in FIG. 10.

Generally speaking, each wall of the box can be formed by one or more panels that are made integral with one another, for example by screwing directly into the panels and/or by using mechanical elements such as brackets or beams. This facilitates access to the satellite's payload volume during the integration and testing phases, in particular by partially assembling the box to integrate the satellite's on-board systems while isolating the vibration-sensitive parts.

The connection between the interface ring 10 and the side panels at the base of the box is damped in nature and allows these panels to be fastened to the interface ring as well as the vibrations therebetween to be filtered. More specifically, the use of one-piece metal machined panels fastened directly to one another, for example by screwing, requires vibrations from the vibration-generating interface ring to be reduced. The vibrations are thus damped so as to better isolate the box, to which sensitive equipment can be rigidly fastened. This damping is achieved by means of damping inserts 60 placed almost individually between the edges 21 of the side panels at the base of the box and the top face 12 of the interface ring. The inserts fit, for example, into recesses 22 provided for this purpose in these side panels.

Figure 4:
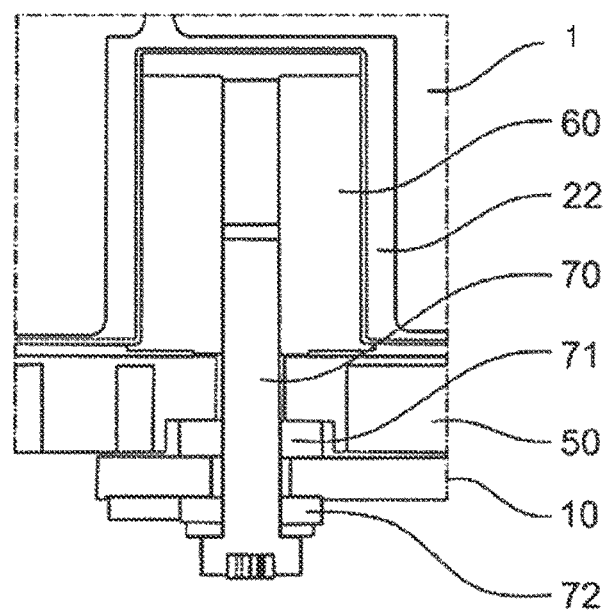

FIG. 4 shows a detailed view of a damping point at which a side panel at the base of the box is fastened to the interface ring 10 via a damping insert 60. The damping insert 60 is placed in a recess 22 of the panel 1. The insert 60 has, for example, a cylindrical portion with a circular cross-section which is inserted into the recess 22 with a circular cross-section. The insert is fastened to the panel by bonding for example. The insert comprises, for example, a threaded hole disposed along the axis thereof, to which a fastening screw 70 is connected. For example, the screw 70 passes through the orifice plate 50 clamped between the insert and the interface ring. The orifice plate fastened to the ring, for example, thus remains at a distance from the side panel at the base of the box. For example, washers are provided on either side of the interface ring 10: a washer 71 made of glass-reinforced plastic such as a glass-fibre reinforced epoxy between the interface ring and the orifice plate 50 and a washer 72 made of titanium between the screw head and the interface ring 10.

Figure 5:
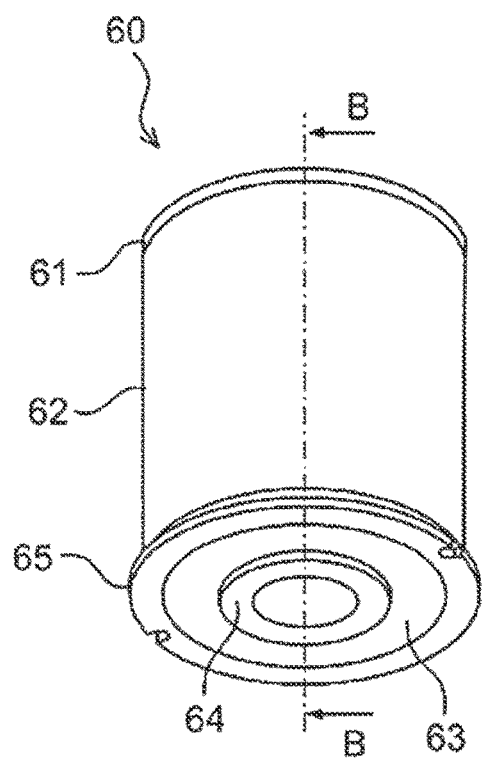

It goes without saying that the invention is not limited to this type of damping insert. With reference to FIG. 5, each damping insert 60 has an axisymmetric cylindrical outer shape that extends longitudinally. The front face 61 of the insert is circular and disposed in the continuation of the outer lateral surface 62 thereof. The front face 61 and the outer lateral surface 62 are intended to be inserted into the recess which also has a circular cross-section. The insert comprises an enlarged lower portion 65 bearing against a surface peripheral to the recess in the panel. The insert comprises a coaxial external part 62 and internal part 64, both of which are tubular, and an elastomer layer 63 filling a space therebetween and connecting them to one another.

The front face 61 of the insert is planar and circular. The lower portion 65 of the insert has a planar annular shape. The front face 61 of the insert can bear against a surface defining the bottom of the recess in the panel.

Figure 6:
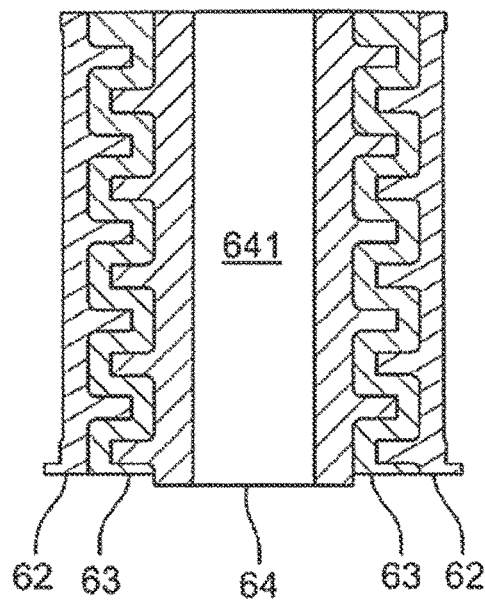

The enlarged annular lower portion 65 bearing against a peripheral surface of the recess in the panel has a thickness that is determined so as to leave a free space between the panel and the orifice plate. As shown in FIG. 6, the inner portion 64 thereof thus projects relative to the outer portion 62 thereof.

The orifice plate is, for example, rigidly fastened to the interface ring. The interface ring 10 and the orifice plate 50 generate vibrations. The side panels at the base of the box are connected to the interface ring via an elastically damped connection.

Advantageous performance levels of the damping insert 60 can be achieved thanks to an arrangement as shown in FIG. 6.

As shown via a cross-section in FIG. 6, the opposing surfaces of the external 62 and internal 64 parts each have a notched profile and are longitudinally offset so as to define a wave-shaped space giving the elastomer layer 63 its final shape.

This design allows the damping inserts 60 to work both under tensile stress when loaded longitudinally and under shear stress when loaded transversely.

The damping insert 60 is easy to install. A damping insert is, for example, coated with adhesive and inserted into the recess 22 made in a side panel at the base of the box. The interface ring can then be fastened to the side panels at the base of the box. The orifice plate 50 is, for example, fastened by screwing against the interface ring by means of screws and washers. The internal part 64 comprises, for example, an axial threaded hole 641 receiving the screw 70, for example with a standard M10 thread pitch. Other means for fastening with the internal part 64 can be considered, such as bonding or press-fitting.

Figure 7:
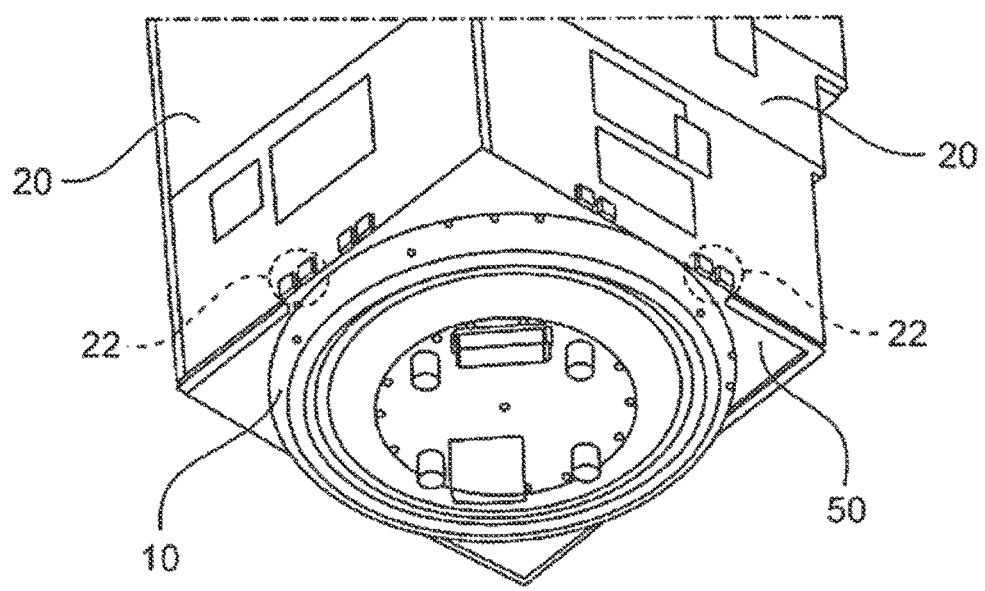

According to the example shown, each side panel at the base of the box includes, on the edge thereof facing the ring, four recesses 22 for receiving damping inserts 60, grouped in pairs. The distance between the two pairs can be different from one panel to another as shown in FIG. 7.

The interface ring 10 is, for example, fastened to the side panels at the base of the box by a set of sixteen damping inserts 60.

Thus, the primary structure 100 as described advantageously combines machined panels with a damped connection to the interface ring 10 made with the damping inserts 60. This combination significantly reduces the vibrations reaching the box and the equipment and instruments fastened directly to the panels of the box.

As a result, the mechanical strength limitations of the primary structure can be reduced, thus reducing the mass of the machined panels forming the box.

The mass of the primary structure 100 and its distribution, in particular the network of ribs of each panel, were determined using a computer optimisation tool.

Modal analyses via numerical simulation in different frequency domains, covering impacts and sinusoidal oscillations, of the satellite 200 comprising the primary structure 100 have validated the behaviour of the satellite relative to the required specifications.

The results have been validated for satellites of different sizes, for example with masses in the range of 100 to 1,000 kg. In the example shown, the satellite has a span of about 1 m×1 m×1 m50.

Figure 8:
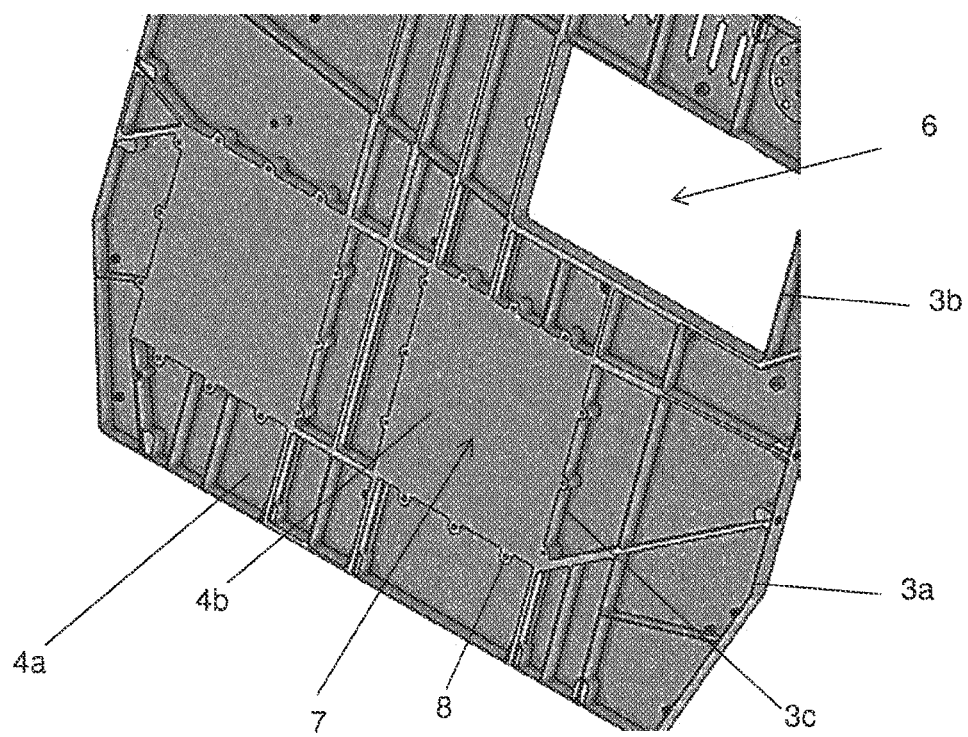

As shown in part in FIG. 8, a panel can comprise an opening 6 intended, for example, for passing an instrument. The panel further comprises a network of ribs. This network of ribs in particular comprises a peripheral rib 3b which defines the opening 6.

Moreover, the network of ribs of the panel can comprise a peripheral rib 3a which defines the entire contour of the panel.

The ribs are connected by thinned plates, obtained for example when machining the metal plate. The panel shown in FIG. 8 further comprises an instrument-holding interface 7. The network of ribs thus comprises, for example, a peripheral rib 3c which defines this instrument-holding interface 7. The instrument-holding interface is closed by a thinned plate 4b, the thickness whereof is determined as a function of a heat evacuation requirement for the instrument. The thinned plates are obtained, for example, by removing material between the ribs on either of the faces of the metal plate.

The thinned plates 4b at the instrument-holding interfaces are disposed on the inside of the box relative to the ribs, whereas the other thinned plates 4a are disposed, for example, on the outside of the box relative to the ribs, thus projecting into the box. The view in FIG. 8 corresponds to a view of the inside of the box. The ribs projecting into the box allow for the fastening, for example by bonding and/or clamping, of internal elements to the spacecraft.

As can be seen in FIG. 8, the ribs are made such that they are wider at determined positions corresponding to drilled and threaded fastening points 8.

Figure 9:
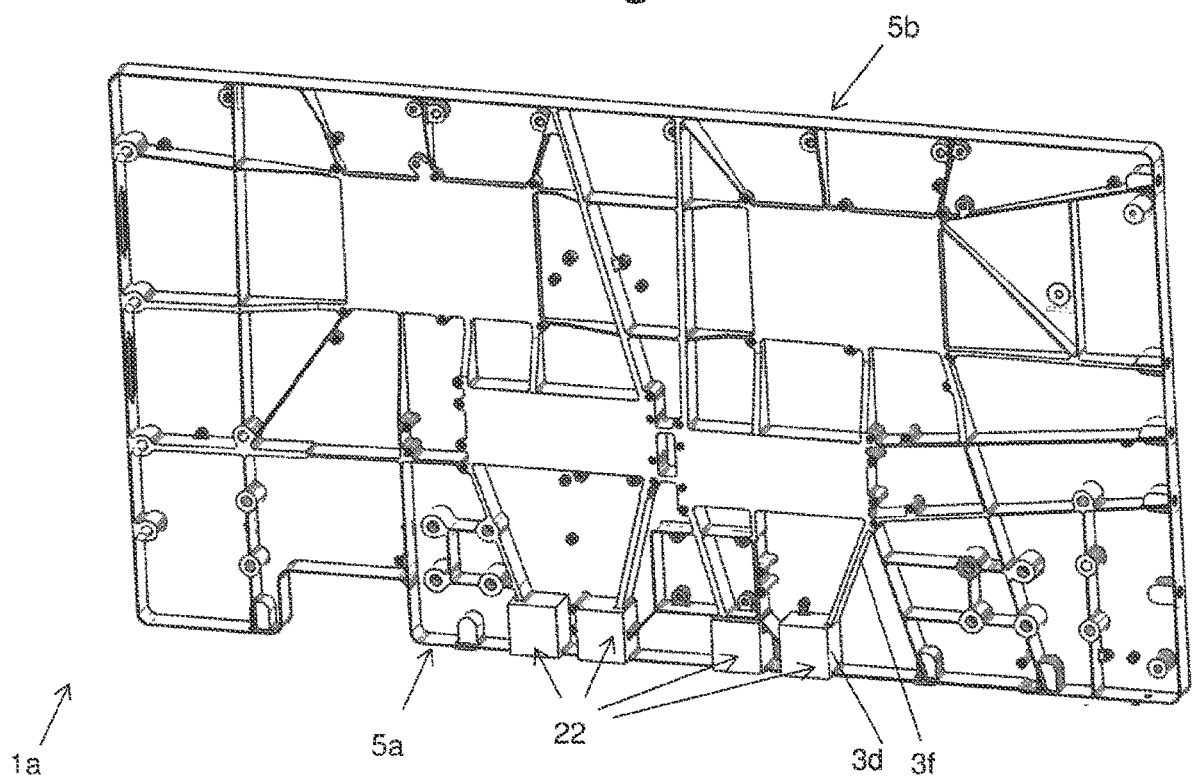

FIG. 9 shows a perspective view of another example of a panel. This panel is obtained by machining a single solid metal block. The thinned plates between the ribs are obtained by removing material. The result in each panel is a network of intersecting ribs connected to one another by the thinned plates.

The network of ribs is arranged in each panel to provide a determined stiffness and a transfer of forces between a proximal edge 5a and a distal edge 5b relative to the interface ring. The proximal edge refers to the edge facing the interface ring and the distal edge refers to the edge facing away from the interface ring.

As shown in FIG. 9, each side panel at the base of the box comprises open recesses 22 for receiving the damping inserts. Each recess is defined by a rib 3d, which is continued by a rib 3f extending in a longitudinal direction relative to the geometric axis A of the interface ring.

The method for manufacturing a satellite thus comprises a step of defining a determined number of panels in order to define the box 2 connected to the interface ring. The panels fastened to one another allow the interior volume of the satellite to be closed off.

These panel dimensions are then used to carry out machining steps on each panel, starting from a single solid metal block from which material is removed. This block is, for example, an aluminium plate.

The machined panels are then assembled directly to one another to form the box, the damping inserts are assembled with the interface ring to form the primary structure of the satellite, and the component elements of the spacecraft are assembled directly with the machined panels. The order of assembly of these different component elements of the spacecraft can be advantageously adapted as required.

As shown in FIG. 9, the machining step results in a network of intersecting ribs connected to one another by thinned plates. These ribs are determined by calculation such that the network of ribs provides a determined stiffness and a transfer of forces in each panel between a proximal edge 5a and a distal edge 5b relative to the interface ring.

The thinned plates are machined, for example, in the plane of one of the faces of the initial metal plate, with the ribs thus projecting from one side or the other. For example, machining by milling is simply carried out on either of the faces of this plate.

If the ribs project into the box, then internal elements of the spacecraft can be fastened thereto by clamping and/or bonding.

As shown in FIG. 10, assembly can take place simply by screwing directly into the machined panels. A screw can pass through a panel in order to be fastened inside a threaded hole in another panel. A metal bracket can also be used with screws passing therethrough and fastening into two panels disposed at right angles.

Finally, it is clear from the present description that certain elements of the structure can be modified, replaced or removed without leaving the scope of the invention as defined by the claims.

The invention claimed is:

1. A primary structure for a spacecraft comprising:
   an interface ring, and
   a predetermined number of panels defining a box arranged to close an interior volume of the spacecraft,
   the box is connected to the interface ring,
   panels of the predetermined number of panels that define sides of the box and the panels are parallel to a geometric axis (A) of the interface ring,
   the interface ring is configured to be temporarily fastened to a system supporting the spacecraft in a launcher,
   wherein each of the panels is a one-piece machined metal panel,
   wherein each of the panels at a base of the box is connected to the interface ring via damping inserts,
   wherein each of the panels includes a network of intersecting ribs connected by a thinned plate, wherein the network of intersecting ribs and thinned plate are machined from a metal block,
   wherein the network of the intersecting ribs in each of the panels is arranged to induce at least a determined stiffness and to transfer forces between a proximal edge of the panel and a distal edge of the panel relative to the interface ring,
   wherein the panels at the base of the box each comprise open recesses configured to receive within the open recess the damping inserts,
   wherein each of the open recesses is adjacent the proximal edge of the panel and is aligned with the geometric axis such that an opening to the open recess faces towards the interface ring;
   wherein each of the open recesses has a corresponding first rib of the intersecting ribs which defines a periphery of the open recesses, and wherein a second rib of the intersecting ribs extends from the first rib across the thinned plate in a direction which does not intersect the geometric axis (A) of the interface ring.

2. The primary structure according to claim 1, wherein said network of ribs in each of the panels comprises a first peripheral rib defining a contour of the panel,
the panels include a first group of panels comprising at least one opening, wherein said network of ribs of each of the panels in the first group comprise at least a second peripheral rib defining said opening,
the panels include a second group of panels comprising at least one instrument-holding interface and said network of ribs of the panels in the second group comprise at least a third peripheral rib defining said instrument-holding interface,
the instrument holding interface is closed by one of said thinned plates having a thickness that is determined as a function of a heat evacuation requirement for an instrument corresponding to the instrument holding interface.

3. The primary structure according to claim 2, wherein a first group of the thinned plates at the instrument-holding interfaces are disposed inside of the box relative to the ribs, whereas a second group of the thinned plates are disposed outside of the box relative to the ribs, wherein the thinned plates of the second group project into the box to allow internal elements to be fastened to the spacecraft.

4. The primary structure according to claim 1, wherein the ribs are wider at determined positions corresponding to drilled and threaded fastening points.

5. The primary structure according to claim 1, wherein each damping insert includes:
an external part fastened in the open recess forming a hole with a given cross-section, the external part having an external surface with a cross-section similar to the hole and configured to be inserted into the recess,
an internal part configured to be fastened to the interface ring, and
an elastomer layer between the external part and the internal part, the external and internal parts being coaxial and having surfaces that face one another and that are notched and longitudinally offset from one another, so as to define a wave-shaped volume receiving the elastomer layer.

6. An artificial satellite comprising the primary structure according to claim 1.

7. A method for manufacturing a spacecraft comprising a predetermined number of panels defining a box connected to an interface ring and arranged to close an interior volume of the spacecraft, wherein the method comprises
forming each panel of the predetermined number of panels by machining a single solid metal block from which metal material is removed to form a network of intersecting ribs, a thinned plate from which protrudes the network of ribs and open recesses,
assembling the panels by connecting the panels y to one another to form the box,
assembling damping inserts with the interface ring to form a primary structure of the spacecraft, the damping inserts being arranged in the open recesses in the panels, wherein the damping inserts are parallel to a geometric axis (A) of the interface ring; and
assembling component elements of the spacecraft with the panels,
wherein the network of intersecting ribs in each of the panels provides a determined stiffness and a transfer of forces between a proximal edge of the panel and a distal edge of the panel relative to the interface ring,
wherein the machining includes forming the open recesses in each of the panels, and the open recesses are configured to receive the damping inserts, are on the panel proximate to the interface ring and are parallel to the geometric axis (A) of the interface ring such that an opening of each of the open recesses faces the interface ring,
wherein a periphery of each of the open recesses is defined by a respective first rib of the network of ribs, and
wherein at least one rib of the network of ribs extends respectively from each of the respective first ribs in a longitudinal direction which does not intersect the geometric axis (A) of the interface ring.

8. The manufacturing method according to claim 7, wherein at least one of the panels is machined such that the network of the intersecting ribs comprises at least one peripheral rib defining at least one instrument-holding interface, the instrument-holding interface being closed by one of said thinned plates having a thickness that is determined as a function of a heat evacuation requirement for the instrument.

9. The manufacturing method according to claim 8, wherein said at least one of the panels is machined such that the thinned plates at the instrument-holding interfaces are disposed inside of the box relative to the ribs, whereas other of the thinned plates are disposed outside of the box relative to the ribs, which are thus disposed such that they project towards the inside of the box to allow internal elements of the spacecraft to be fastened thereto.

10. The manufacturing method according to claim 7, wherein the panels are machined leaving a rib defining a periphery of each of the panels.

11. The manufacturing method according to claim 7, wherein panels are machined while making at least one opening and leaving at least one rib defining the periphery of said opening.

12. The manufacturing method according to claim 7, wherein the ribs are made such that the ribs are wider at determined positions corresponding to drilled and threaded fastening points.

* * * * *